United States Patent [19]

Branson et al.

[11] 3,975,857

[45] Aug. 24, 1976

[54] RODENT TRAP

[76] Inventors: Donald M. Branson, Rte. 1, Box 75, Brandon, S. Dak. 57005; Kermit A. Klitzke, 227 Tenth Ave., Worthington, Minn. 56187

[22] Filed: May 12, 1975

[21] Appl. No.: 576,455

[52] U.S. Cl. ................................. 43/61
[51] Int. Cl.² .......................... A01M 23/16
[58] Field of Search ........................ 43/61, 69

[56] References Cited
UNITED STATES PATENTS

| | | | |
|---|---|---|---|
| 993,238 | 5/1911 | Gates | 43/61 |
| 1,889,276 | 11/1932 | Dorrien | 43/69 |
| 2,485,319 | 10/1949 | Rosen | 43/61 |
| 3,823,504 | 7/1974 | Dosch | 43/61 |

*Primary Examiner*—Louis G. Mancene
*Assistant Examiner*—Daniel J. Leach
*Attorney, Agent, or Firm*—Merchant, Gould, Smith, Edell, Welter & Schmidt

[57] ABSTRACT

An improved rodent trap for use where sanitary conditions are required. The trap housing includes a rodent activated trip mechanism which dislodges a door prop causing the spring or weight biased door to latch shut trapping the rodent inside. Air seals are provided around the door so the rodent is caused to suffocate. A transparent inspection panel, which may be the door, is provided for allowing the user to determine whether the trapped rodent is still alive.

13 Claims, 5 Drawing Figures

RODENT TRAP

BACKGROUND OF THE INVENTION

The present invention relates generally to rodent traps, and more specifically to improved rodent traps for use where sanitary conditions are required.

The prior art includes a wide variety of structures and mechanisms which have been proposed for the purpose of trapping mice or other small rodents. While most of these prior art devices perform their intended function with greater or lesser degrees of efficiency, there has still existed a need in the art for an improved and highly efficient trap for use in situations in which a high degree of cleanliness and sanitary conditions must be maintained. For example, in restaurants, bakeries, graineries or other places in which food is handled or prepared, it is desirable to control and depose of rodents in the most sanitary possible way, so as to avoid the possibility of contamination or attraction of insects or other pests.

With conventional snap-type mouse traps, mutilation of the animal's body by the trap can lead to the creation of unsanitary conditions. Further, since in practice the traps may not be checked for many hours after the animal is killed, and since the animal is fully exposed, there is a likelihood of the attraction of flies or other insects and the creation and spreading of hazardous germs and offensive odors.

Traps according to the present invention overcome these problems of conventional traps by the use of suffocation within a sealed enclosure to kill the rodent. Once the rodent is lured into the trap by the bait, its weight on the trip mechanism causes a spring or weight loaded door to close, trapping the rodent inside. An air tight seal is provided around the door so that the animal dies of suffocation, usually within about 5 minutes or so. The usual unsanitary situations involving trapped dead animals are avoided since no physical trauma or mutilation has been inflicted upon the trapped animal, and also because the entire trap is air tight, preventing odors from getting out, or insects from getting in.

Although other types of traps have been proposed in the prior art which utilize the principle of suffocation, they have in general suffered from the disadvantages of an unnecessarily complex trip mechanism, or the necessity of providing valves and fittings for introducing a suffocating gas. Further, the prior art suffocation type traps have not provided a convenient way of determining whether the rodents trapped therein have died, other than by opening the door. Of course, if the rodent has not yet died, he may escape when the door is opened.

The present invention overcomes these and other problems existing in the prior art by providing an improved suffocation type trap, having an improved and simplified trip mechanism. According to another aspect of the present invention, a transparent inspection panel is provided allowing the user of the trap to see whether the rodent has died before opening the trap.

SUMMARY OF THE INVENTION

According to one aspect of the present invention, a rodent trap is provided having a housing defining an enclosure having a door opening, and a door hinged to the housing for closing the opening. Sealing means are provided around the door to provide an air tight seal within the housing when the door is closed. The door is held opened by a trip mechanism, and it is urged closed by a spring or weight. The trip mechanism is actuated by a rodent, and causes the door to slam shut, thereby trapping and suffocating the rodent. A transparent inspection panel is provided in the housing for viewing the inside thereof without the necessity of opening the door. The transparent panel can be any panel of the housing, or it can be the door itself.

In a preferred embodiment, a panel slides tightly into slots in the other end of the housing, and can be removed for disposing of the trapped rodent.

According to another aspect of the present invention, an improved and simplified trip mechanism for the trap is provided, comprising a door prop member having one end connected to the hinged door and having a shoulder formed in its other end for normally engaging an abutment member attached to the housing, so as to hold the door in its open position. A treadle platform is pivotally mounted inside the housing, and is adapted to hold the bait at one end. A trip lever has one end connected to the treadle platform and its other end adjacent the door prop member, so that activation of the treadle platform causes the trip lever to move the door prop member off the abutment member, thereby causing the door to close.

In a preferred embodiment, the door prop is biased in a downward direction, and the shoulder in the end of the door prop member is part of a U-shaped catch which cooperates with a catch pin in the housing. This arrangement allows the trip mechanism to be automatically reset when the door is manually opened.

DESCRIPTION OF THE PREFERRED EMBODIMENT

Figure 1:
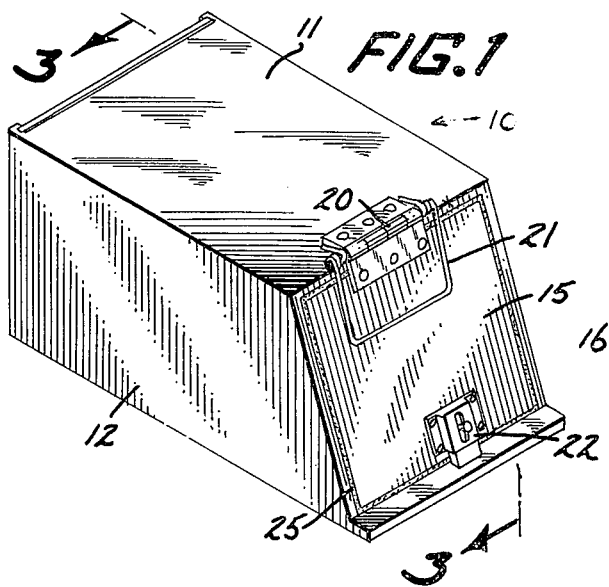
FIG. 1 is a view in perspective of a trap according to the present invention, showing generally the front side thereof.
Figure 2:
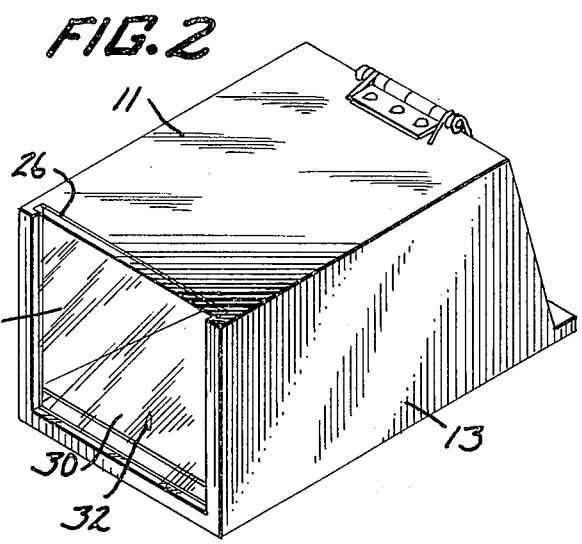
FIG. 2 is another view in perspective of the trap of FIG. 1, showing generally the rear side thereof.

Referring to FIG. 1, reference numeral 10 generally designates a rodent trap according to the present invention. The trap comprises a generally elongated rectangular housing having a top 11, sides 12 and 13, and a floor 14. As shown in FIGS. 1 and 2, the housing has a first opening at one end for receiving the hinged door 15, and a second opening at its other end for receiving the transparent inspection panel 16.

Figure 3:
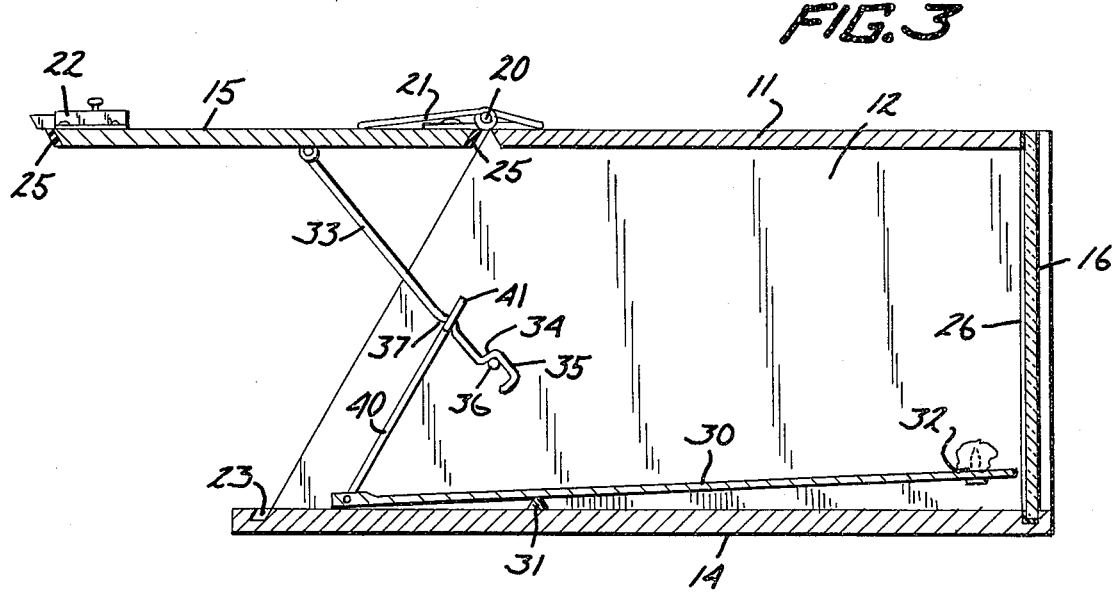
FIG. 3 is a view in elevation taken generally along the section 3—3 of FIG. 1.

As particularly shown in FIG. 3, sides 12 and 13 are trapezoidal in shape, and top 11 is of lesser longitudinal dimension than floor 14 to conform to the trapezoidal shape of sides 12, 13. As such, the first opening and door 15 are obliquely disposed relative to the housing with the door 15 defining an obtuse angle with top 11 and an acute angle with floor 14.

Door 15 is attached to the top 11 of the housing by a hinge 20. A spring 21 is provided for normally urging the door 15 into its downward, or closed position. A spring loaded latch 22 is connected near the bottom edge of door 15, and cooperates with a slot 23 in the floor 14 of the housing to hold the door closed. As seen in FIG. 3, air sealing means 25 is provided around door 15 so that an air tight seal is obtained when the door is closed. The housing and door may be made of any convenient materials, such as wood, metal or plastic.

Referring again to FIGS. 2 and 3, the removable transparent inspection panel 16 is slideably received by slots formed in the housing near the end thereof. Further air sealing means 26 is provided in the slot to maintain the air seal of the housing. The air sealing means may be rubber or resilient plastic strips, for example.

Figure 5:
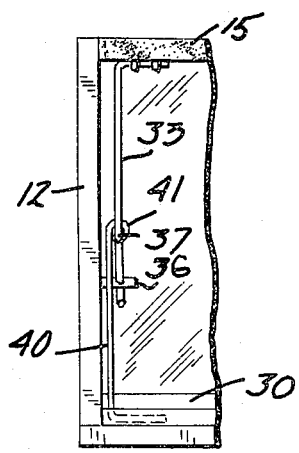
FIG. 5 is a view in elevation, portions thereof broken away.

Referring now to FIGS. 3 and 5, the trip mechanism will be explained. A treadle platform 30 is provided within the housing above the floor thereof. The treadle is attached at a fulcrum or other pivot point, indicated by reference numeral 31. This point may be a member along the floor of the housing which serves as a fulcrum or it may be a pair of pivots in the walls of the housing, engaging corresponding pivot receiving structures attached to the treadle.

The end of the treadle platform closest to the inspection panel is adapted to receive the bait, as for example, by the provision of a small spike or clip at the location indicated by reference numeral 32.

As shown in FIGS. 3 and 5, a door prop 33 is connected at one end to the door 15. Any type of mount or connection between the door prop 33 and the door 15 may be used. At its other end, door prop 33 has a shoulder portion 34. In the preferred embodiment, this shoulder portion 34 is part of a U-shaped catch 35 formed in the end of the door prop. The shoulder 34 of the catch cooperates with a catch pin 36, or other abutment member which is attached to the wall 12 of the housing.

A trip lever 40 is positioned between the treadle platform 30 and the door prop 33. One end of trip lever 40 is connected to the treadle platform, between the fulcrum 31 and the end closest to the hinged door. The other end of trip lever 40 is adjacent the door prop 33. In the preferred embodiment, the other end of trip lever has an eyelet 41 formed therein, and this eyelet encircles the door prop. A slight bend or shallow notch 37 may be provided in the door prop 33 to assist in locating the trip lever 40.

FIGS. 3 and 5 show the trap in its set condition, with the spring biased door 15 held open by door prop 33, whose shoulder 34 abuts against the catch pin, or other abutment member 36. The treadle platform 30 is positioned with its end nearest the door 15 down, and its end containing the bait up. The trip lever 40 rests lightly against the door prop.

When a mouse or other rodent enters the trap toward the bait, once it has passed the fulcrum point 31, its weight on the treadle platform causes the treadle to move in a clockwise direction around the fulcrum. This movement causes the trip lever 40 to move upwardly against the door prop 33, shoving the shoulder thereof off the catch pin 36 on which it has been resting. With the support for the door removed, the spring 21 snaps the door 15 closed, and the latch 22 snaps in place to hold the door closed. With the door closed, completing the air tight seal, the rodent dies when the oxygen is used up.

The user of the traps may simply look through the transparent inspection panel to see whether a rodent has been caught, and whether it is dead or still alive. If it is dead, the entire trap can be carried to a location for disposing of the body, the panel 16 can be slid open, and the housing tilted to dump the body out, all without having to touch the body with the hands. The bait can be replaced, if necessary, the inspection panel may then be closed again, and the door may then be reset.

The latch 22 is slid open and the door 15 is drawn upward to the position shown in FIG. 3. In the preferred embodiment, the connection of door prop 33 to door 15 is selected to provide a downward spring bias to the door prop 33. In other words, door prop 33 is normally urged in a clockwise direction around its connection point to door 15, as seen in FIG. 3. This can be accomplished by a separate spring, or any other suitable means. In the preferred embodiment, door prop 33 is formed from a piece of wire, and the necessary downward spring bias is accomplished by the initial orientation of the door prop when it is attached to the door.

During the door closing, door prop 33 is caused to move up and over catch pin 36. Upon reopening the door, the door prop is slid back along catch pin 36 until the spring bias causes the U-shaped catch portion 35 to fall in place on the catch pin. The final bend in the U-shaped catch portion 35 prevents over-extension of the door, which would otherwise allow the door prop to fall off the catch.

Of course it will be understood that the weight threshold required to trip the mechanism is function of the geometry of the various levers and mechanisms involved, including the positioning of the fulcrum. These parameters can be designed as required to give any desired tripping weight threshold. It will also be appreciated that instead of the spring 21, the door can be activated by gravity. If necessary, an additional weight can be attached to the door 15 for this purpose.

In the presently preferred embodiment, the door prop 33 and the trip lever 40 are made of wires bent into the necessary shapes. It will be appreciated, however, that the same result could be achieved by making these members from any suitable material. Likewise, the catch pin 36 may be simply a a nail or staple driven into the wall 12 of the housing. Or, it could be a protrusion or other abutment member molded integrally with the housing. Similarly, the means of attaching the trip lever 40 to the treadle platform 30, and of attaching the door prop 33 to the door 15 can be varied according to the materials being used to construct the trap, without departing from the scope of the present invention.

While the drawing shows the presently preferred embodiment, the present invention can be made with or without the removable panel 16. In other words, the end of the trap can be mounted to the rest of the housing in a nonremovable manner, and loading of bait and emptying of the trapped mouse can all be accomplished through the door 15. Alternatively, a separate removable panel or door could be placed in the top, bottom, or either side of the housing, as desired.

Similarly, it is not necessary for the transparent inspection panel to be at the end of the housing. Further, even if a separate removable panel is used, that panel can be opaque and a different panel can be made transparent. If desired, the door 15 can be made transparent and thus serve a dual function, or all or part of any other portion of the housing can be made transparent, whether removable or not.

The unique linkage thus provided according to the present invention takes up very little space and can advantageously be placed adjacent the inside of a wall of the housing, as shown in FIG. 5. This permits making the entire trap housing very small, essentially as small as the size of the rodent to be trapped will allow. This, of course, is an advantage not only in terms of lower initial cost, but also in terms of convenience and efficiency in the use of the traps.

Figure 4:
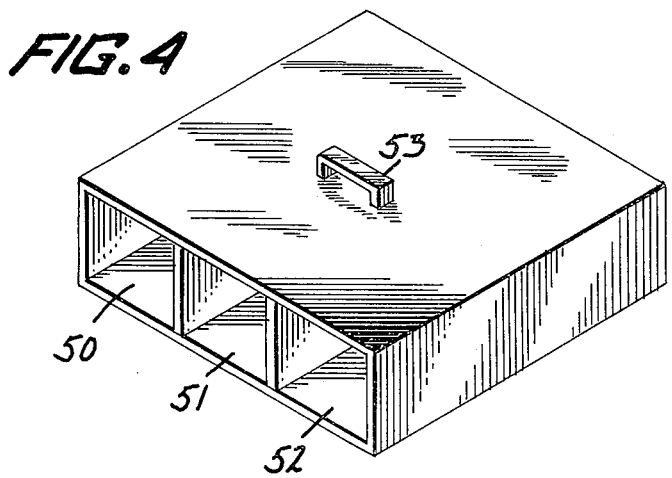
FIG. 4 is a view in perspective of a fixture for holding a plurality of traps.

FIG. 4 shows a multiple trap housing which may conveniently be provided for use of the trap according to the present invention. The multiple trap housing has openings 50-52, each sized to receive a single trap such as trap 10 of FIG. 1. The handle 53 is provided for carrying the assembly to the location of use.

In addition to providing greater cleanliness and sanitation than the prior art traps, the present invention also provides a greater degree of safety in the event of a small child getting his fingers in the trap. Although the spring loading of the door 15 is sufficient to hold the door shut, or to insure latching of the latch 22, it is generally not necessary that the spring be as strong as the springs used in conventional snap traps, and it is not strong enough to injure the fingers if accidentally inserted in the trap.

Thus, according to the present invention, we have provided an improved, sanitary rodent trap, which offers a high degree of safety and efficiency in use.

We claim:

1. A rodent trap comprising:
   a. a housing of predetermined longitudinal dimension defining an enclosure, the housing having a door opening in one end thereof which is oblique relative to the housing;
   b. a door hingedly attached to said housing adjacent said oblique opening and operable to close the opening;
   c. means attached to said door for normally urging said door to its closed position;
   d. means associated with said door and said housing for forming an air tight seal when said door is in its closed position;
   e. an abutment member attached to said housing;
   f. a door prop member having one end connected to said door and having a shoulder formed therein for normally engaging said abutment member to hold said door in its open position;
   g. a flat treadle platform having first and second ends disposed within the housing with the first end proximate the door opening, the treadle platform being pivotally mounted intermediate its ends above the housing floor, the second end of the treadle platform adapted to receive rodent bait;
   h. and a trip lever having one end connected to the treadle platform between said intermediate point and the first end thereof and having its other end disposed for engagement with said door prop member, the trip lever adapted to engage and move said door prop off said abutment member in response to pivoting of said treadle platform, whereby the door is caused to close in response to a rodent entering the trap.

2. A rodent trap according to claim 1 wherein said means for urging said door comprises a spring for biasing said door in a closed direction.

3. A rodent trap according to claim 1 wherein said means for urging said door comprises a weight.

4. A rodent trap according to claim 1 further including latch means associated with said door and said housing for holding said door closed after it has closed in response to a rodent entering the trap.

5. A rodent trap according to claim 1 wherein said trip lever includes an eyelet on said other end, said eyelet encircling said door prop member, and wherein said other end of said door prop member includes a U-shaped catch for engaging said abutment member, whereby said door of said trap is automatically reset when it is manually opened.

6. A rodent trap according to claim 1 wherein said housing includes a transparent inspection panel for viewing the contents of the trap.

7. A rodent trap according to claim 6 wherein said transparent inspection panel is removably connected to said housing in air sealed relationship, and is removable for emptying the contents of said trap.

8. A rodent trap according to claim 7 wherein said housing is generally rectangular in configuration, having said hinged door at one end thereof, and having said removably connected transparent inspection panel in the other end thereof.

9. A rodent trap according to claim 8 wherein said housing has slots near said other end for slideably receiving said transparent inspection panel.

10. A rodent trap according to claim 1 wherein said housing includes a removable panel removably connected to said housing in air sealing relationship thereto, said panel being removable for emptying the contents of said trap.

11. A rodent trap according to claim 1, wherein the housing comprises a rectangular top and floor and trapezoidal sides, the top being of lesser longitudinal dimension than the floor in conformance with said trapezoidal sides, and said door in its closed position defines an obtuse angle with the top and an acute angle with the floor.

12. A rodent trap according to claim 1, and further comprising means associated with said second end of the treadle platform for securing rodent bait thereto.

13. A rodent trap according to claim 1, wherein the door prop member is pivotally connected to the door member, and the trip lever is pivotally connected to the treadle platform.

* * * * *